UNITED STATES PATENT OFFICE 2,039,653

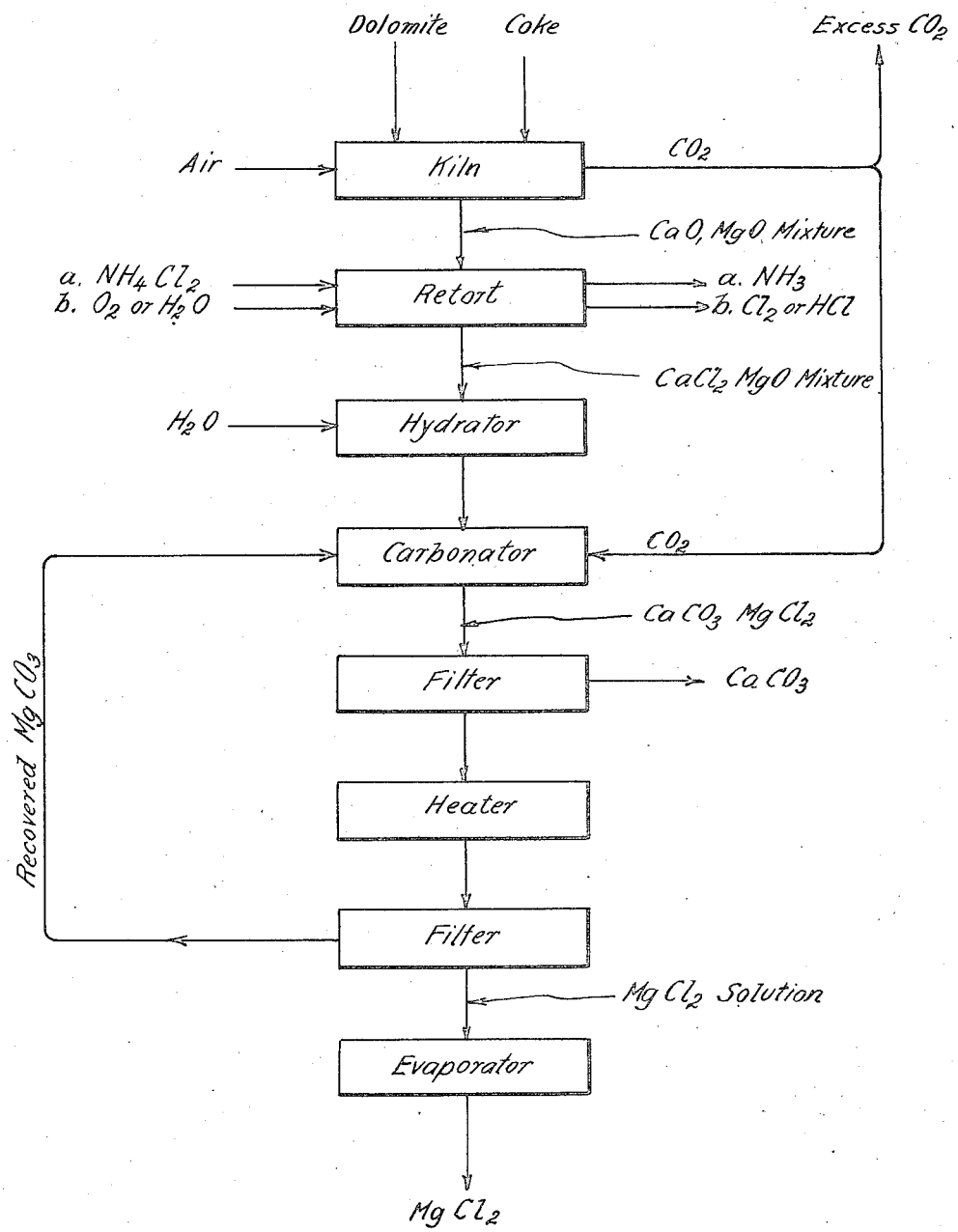

MANUFACTURE OF THE OXIDE AND THE CHLORIDE OF MAGNESIUM

Robert Burns MacMullin, Niagara Falls, N. Y., assignor to The Mathieson Alkali Works, Inc., New York, N. Y., a corporation of Virginia Application May 16, 1932, Serial No. 611,576

4 Claims. (Cl. 23—91)

This invention relates to improvements in the manufacture of magnesium chloride from dolomite and ammonium chloride. The complete process of the invention comprises calcination of dolomite to produce a mixture of magnesium and calcium oxides, treatment of this mixture with ammonium chloride at elevated temperature to produce a mixture of magnesium and calcium chlorides, differential conversion of this mixture to produce a mixture of magnesium oxide and calcium chloride and treatment of this mixture with carbon dioxide in the presence of water to precipitate calcium carbonate and to produce a solution of magnesium chloride. The invention includes the complete process, improvements in several of the steps combined in the complete process and certain novel combinations of these steps.

In some forms in which the ammonia soda process is practiced, solid ammonium chloride is obtained as a by-product. The ammonia content of this ammonium chloride may be recovered, for re-use in the ammonia soda process for example, by treatment with lime or magnesia. Calcined dolomite may be used for this treatment, but when used mixtures of magnesium and calcium chlorides are produced. No practical method for the separation of the magnesium and calcium contents of such mixtures has hitherto been developed. This invention provides an improved method for producing magnesium chloride substantially free from calcium compounds from dolomite with ammonium chloride which, in conjunction with the ammonia soda process, affords an advantageous method of recovery of the ammonia content of the ammonium chloride.

In carrying out the complete process of the present invention: Dolomite, containing approximately equal molecular proportions of magnesium carbonate and calcium carbonate, is calcined to expel the carbon dioxide, at a temperature approximately 1000° C. for example. The calcined dolomite, a mixture of magnesium and calcium oxides, is subjected to the action of an approximately equivalent amount of ammonium chloride at a temperature approximating 300–550° C. to liberate ammonia. The reaction may be illustrated as follows:

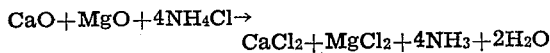

This reaction may be effected either by mixing the calcined dolomite with the ammonium chloride, dry, at a temperature below 300° C. and thereafter heating the mixture to 300–500° C. in an appropriate retort or by passing previously vaporized ammonium chloride over the calcined dolomite while maintaining the latter at a temperature of 300–500° C. in an appropriate retort. An inert gas, nitrogen from the carbonating towers used in the ammonia soda process for example, may be passed through the retort to assist in carrying out the ammonia and steam and in bringing the reaction substantially to completion. The ammonia so liberated may be returned to the ammonia soda process. The mixture of magnesium and calcium chlorides thus produced is subjected to a differential conversion to convert the magnesium chloride to magnesium oxide without conversion of the calcium chloride. This reaction may be effected in the same retort in which the oxide mixture was converted to the chloride mixture. This differential conversion may be effected by passing free oxygen, air or other gas mixture including free oxygen through the retort while maintaining a temperature of 400–700° C. in the retort. The reaction may be illustrated as follows:

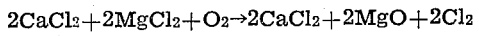

The chlorine evolved may be recovered in any appropriate manner. This differential conversion may also be effected by passing water vapor or gas mixtures including the same through the retort while maintaining a temperature of 400–650° C. in the retort. The reaction may be illustrated as follows:

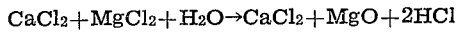

The hydrochloric acid evolved may be recovered in any appropriate manner. The differential conversion may also be effected, in this manner, with mixtures of free oxygen or a gas mixture including free oxygen and water vapor to produce mixtures of chlorine and hydrochloric acid in proportions varying in accordance with the proportion of free oxygen and water vapor used. The mixture of magnesium oxide and calcium chloride thus produced is subjected to the action of carbon dioxide in the presence of water to precipitate calcium carbonate and to form an aqueous solution of magnesium chloride. The precipitated calcium carbonate is separated from the magnesium chloride solution, by filtration for example. This magnesium chloride solution from which the calcium carbonate has been separated may contain small amounts of magnesium bicarbonate and traces of calcium bicarbonate. These bicarbonates are precipitated as the corresponding carbonates by heating the solution to the boiling temperature to expel carbon dioxide and the precipitated carbonates are separated from the solution, by filtration for example. The separated magnesium and calcium carbonates are with advantage returned to the reaction in which the mixture of magnesium oxide and calcium chloride is converted to magnesium chloride and calcium carbonate. Following the separation of these carbonates, the magnesium chloride may be recovered from the solution in any appropriate manner, by evaporation and crystallization for example. The calcium carbonate initially separated from the magnesium chloride solution produced by conversion of the mixture of magnesium oxide and calcium chloride may be washed free from magnesium compounds and calcined to produce a lime of high purity, useful for example in the ammonia soda process or in the causticization of sodium carbonate.

In the differential conversion of the magnesium chloride content of the magnesium chloride-calcium chloride mixture produced by treatment of the mixed oxides with ammonium chloride, the temperature should be limited not to exceed about 700° C., or better 650° C., to avoid conversion of the calcium chloride present to calcium oxide. It is further advantageous to limit this temperature not to exceed about 620° C. since above this temperature a eutectic tends to form and melt, substantial proportions of both magnesium chloride and calcium chloride being present, and thus to interfere with the operation.

It is possible to effect some separation of calcium chloride and magnesium oxide, from the mixture produced by differential conversion of the chloride mixture, by treating the mixture with water to dissolve the calcium chloride and to leave the magnesium oxide, but the formation of insoluble basic magnesium chlorides interferes with this operation. Magnesium chloride, moreover, is not obtained as a direct product of this operation. By subjecting the magnesium oxide-calcium chloride mixture to the action of carbon dioxide in the presence of water, the formation of basic magnesium chlorides is avoided or any formed are decomposed and the magnesium content of the mixture is converted substantially completely to magnesium chloride.

In the conversion of the magnesium oxide-calcium chloride mixture to magnesium chloride and calcium carbonate, the amount of water is advantageously limited to obtain a concentrated solution containing as much as 15-20% of magnesium chloride or more. However, if the amount of water used is too limited the slurries produced become difficult to handle. The carbon dioxide used in this conversion may be supplied in high concentration or in the form of a gas mixture containing a relatively small proportion of carbon dioxide. Flue gases containing upwards of 12% $CO_2$, for example, are useful in this connection. The carbon dioxide expelled in the precipitation of magnesium and calcium bicarbonates as carbonates may be recovered and used in the operation.

The accompanying drawing illustrates, as a flow sheet, one embodiment of the combined operation of the invention. The conversion of the oxide mixture to the chloride mixture with ammonium chloride and the subsequent differential conversion of the chloride mixture to a mixture of magnesium oxide and calcium chloride are both illustrated as carried out in the "retort", the first of these operations being designated "a" and the second being designated "b".

The invention includes improvements in the manufacture of magnesium chloride from dolomite and ammonium chloride. The invention also includes improvements in the separation of the magnesium and calcium contents of mixtures of magnesium and calcium chlorides, improvements in the separation of the magnesium and calcium contents of mixtures of magnesium oxide and calcium chloride, improvements in the production of magnesium chloride from mixtures of magnesium and calcium chlorides, improvements in the production of chlorine and ammonia from ammonium chloride, improvements in the recovery of ammonia from ammonium chloride, and improvements in the production of mixtures of magnesium oxide and calcium chloride from dolomite.

I claim:

1. In the production of magnesium chloride from mixtures of magnesium and calcium chlorides, the improvement which comprises subjecting the mixture to the action of a reagent selected from the group consisting of free oxygen, water vapor and gas mixtures including the same at a temperature of 400-700° C., and subjecting the resulting mixture of magnesium oxide-calcium chloride to the action of carbon dioxide in the presence of water and separating the precipitated calcium carbonate from the solution of magnesium chloride thus produced.

2. In the production of magnesium chloride from dolomite and ammonium chloride, the improvement which comprises calcining the dolomite, subjecting the resulting mixture of magnesium and calcium oxides to the action of ammonium chloride at a temperature of 300-550° C., subjecting the resulting mixture of magnesium and calcium chlorides to the action of a reagent selected from the group consisting of free oxygen, water vapor and gas mixtures including the same at a temperature of 400-700° C., subjecting the resulting mixture of magnesium oxide and calcium chloride to the action of carbon dioxide in the presence of water and separating the precipitated calcium carbonate from the solution of magnesium chloride thus produced.

3. In the production of mixtures of magnesium oxide and calcium chloride from dolomite, the improvement which comprises calcining the dolomite, subjecting the resulting mixture of magnesium and calcium oxides to the action of ammonium chloride at a temperature of 300-550° C., and subjecting the resulting mixture of magnesium and calcium chlorides to the action of a reagent selected from the group consisting of free oxygen, water vapor and gas mixtures including the same at a temperature of 400-700° C.

4. In the recovery of ammonia and chlorine from ammonium chloride, the improvement which comprises subjecting ammonium chloride to the action of a mixture of magnesium and calcium oxides at a temperature of 300-550° C., and subjecting the resulting mixture of magnesium and calcium chlorides to the action of a reagent selected from the group consisting of free oxygen, water vapor and gas mixtures including the same at a temperature of 400-700° C.

ROBERT BURNS MacMULLIN.